(12) United States Patent
Guyot et al.

(10) Patent No.: US 8,599,931 B2
(45) Date of Patent: Dec. 3, 2013

(54) LOCAL FLEXTREAM OVER INTERNET PROTOCOL

(75) Inventors: Tony Guyot, Rennes (FR); Georges Joulaud, Liffre (FR); Alexis Berlemont, Rennes (FR)

(73) Assignee: Thomson Licensing, Issy les Moulineaux (FR)

( * ) Notice: Subject to any disclaimer, the term of this patent is extended or adjusted under 35 U.S.C. 154(b) by 309 days.

(21) Appl. No.: 12/927,700

(22) Filed: Nov. 22, 2010

(65) Prior Publication Data

US 2011/0216819 A1    Sep. 8, 2011

(30) Foreign Application Priority Data

Nov. 27, 2009   (EP) ..................... 09177327

(51) Int. Cl.
*H04N 7/18*   (2006.01)
(52) U.S. Cl.
USPC .................................... 375/240.26
(58) Field of Classification Search
USPC ...................... 375/240.01–240.29
See application file for complete search history.

(56) References Cited

U.S. PATENT DOCUMENTS

| 7,898,951 | B2 * | 3/2011 | Koba et al. ............... 370/232 |
| 8,095,615 | B2 * | 1/2012 | Briscoe et al. ............ 709/208 |
| 2006/0224762 | A1 | 10/2006 | Tian et al. | |
| 2011/0051811 | A1 * | 3/2011 | Wang et al. ............. 375/240.12 |

FOREIGN PATENT DOCUMENTS

WO   WO2004077835   9/2004

OTHER PUBLICATIONS

Felts et al., "Envivio IP-Base Statistical Rate Control", Retrieved from the Internet: URL: http://www.envivio.com/pdf/IPStatRate_Final.pdf>, Feb. 22, 2007, pp. 11-14.
Motorola: "Statistical Multiplexing Over IP—StatmuxIP(TM) Solution", Retrieved from the Internet: URL:http://www.motorola.com/staticfiles/Business/Products/TV%20Video%20Distribution/Video%20Distribution/Multiplexers/SX-1000/_Documents/_Static%, Jan. 23, 2009.
Schreier, "IEEE 1558 to Transform Timing Synchronization", Evaluation Engineering, Retrieved from the Internet: URL:http://www.1xiconnexion.com/articles/0409/0409_1xi.pdf>, May 24, 2009.
Tandberg: "Reflex & Data Reflex", Retrieved from the Internet: URL:   http://www.tandbergtv.com/uploads/documents/Tandberg1328Pages1.pdf>, Sep. 30, 2008.
Search Report Dated Feb. 8, 2010.

* cited by examiner

*Primary Examiner* — Andy Rao
(74) *Attorney, Agent, or Firm* — Tutunjian & Bitetto, P.C.

(57) ABSTRACT

The invention relates to the field of digital television. More exactly, the invention deals with video compression equipments inside television head-ends, which comprise encoders grouped in encoding pools for statistical multiplexing. The invention also concerns of a method for driving individual output bitrates for encoders gathered in such encoding pool. The present invention concerns an encoding pool comprising a master encoder MVE and at least one slave encoder SVEi, each encoder MVE, SVEi receiving an uncompressed video stream UM, USi and issuing an encoded stream TM, TSi via a first extremity of an IP link IPLM, IPLi, all second extremities of said IP links IPLM, IPLi being bound to a switch IPS, the at least one slave encoder SVEi sending a piece of information on the complexity Cli of the uncompressed video stream USi, the master encoder MVE evaluating an allocation for output bitrate BRi of the at least one slave encoder SVEi from the piece of information on the complexity Cli and sending said allocation BRi to the at least one slave encoder SVEi.
According to the invention, the piece of information on the complexity Cli and the allocation for output bitrate BRi are transmitted via a path $P_t$ comprising the IP link IPLi, the switch IPS and the IP Link IPM.

10 Claims, 1 Drawing Sheet

LOCAL FLEXTREAM OVER INTERNET PROTOCOL

This application claims the benefit, under 35 U.S.C. §119 of European Patent Application 09177327.5, filed Nov. 27, 2009.

BACKGROUND OF THE INVENTION

1. Field of the Invention

The invention relates to the field of digital television. More exactly, the invention deals with video compression equipments inside television head-ends, which comprise encoders grouped in encoding pools for statistical multiplexing. The invention also concerns of a method for driving individual output bitrates for encoders gathered in such encoding pool.

2. Description of the Prior Art

In the state of the art of television head-ends, it is known, as indicated on the FIG. 1, that a set of encoders MVE, $SVE_i$ (where $1<i<N$) is organized in pool for sharing a same bandwidth. With this organization in pool one optimizes the picture quality over a constant bandwidth allocated for global output to the set of encoders. So, these encoders MVE, $SVE_i$ continuously exchange information to adjust their own video bitrate at a level needed for the best picture quality. Information is transmitted (mainly the video bitrate needs) from slave encoders $SVE_i$ in the pool to an encoder MVE assuming bitrate allocation role (master encoder). In a pool, all encoders are identical and each encoder has the ability to be a master. Designation of an encoder as a master is a user decision and this designation can be modified in case of degraded mode of operation. Then, after algorithm calculation, this master encoder MVE redistributes information (individual video bitrate) to each slave encoder $SVE_i$ of the pool according to the received request (complexities). This mechanism is statistical multiplexing and is known as "Local Flextream". Currently this mechanism uses a dedicated RS-485 hardware link (HDLC) with Sub-D 9 pins connectors and specific cable between all the encoders of the pool for the exchange of information.

In FIG. 1, one denotes no particular difference between the streams received by master encoders and slave encoders. Names "UM" or "$US_i$" are only used for naming consistency purpose. A similar remark can be done for streams issued by master encoder "TM" and slave encoders "$TS_i$".

A disadvantage of this state of the art is this dedicated hardware which is to be set up between all encoders MVE, $SVE_i$: it represents complexity in the design of the encoder pool and associated manufacturing costs.

One of the goals of the present invention is to propose a solution to get rid of this dedicated hardware.

Today, the only known way to use the Flextream capability without the dedicated hardware link is a solution known as "remote Flextream" which consists in deporting the task of allocation outside the head-ends and to assign the new bitrate allocation through an external network (Wide Area Network). But the remote Flextream carries some drawbacks: it is expensive to deploy for small head-ends since it requires the use of additional equipments (multiplexers) and it is less accurate than the local Flextream. Finally, it generates a waste of bandwidth and consequently a worse picture quality.

Another advantage of the invention is that it can dispense with the use of a proprietary multiplexer compatible with "remote flextream" mode and then to benefit a larger flexibility in designing systems by using multiplexer "on the shelf" and/or low-cost which do not perform this "remote flextream" mode.

SUMMARY OF THE INVENTION

The technical problem that present invention intends to solve is to distribute the allocation of individual output bitrates to various encoders forming a pool according to a request/client without using a dedicated hardware link. The invention concerns a use of an already existing link over IP protocol and reaches the same delay accuracy for bitrate changes for avoiding a dedicated hardware allowing information exchanges between encoders.

Thus, the present invention concerns according to a first aspect an encoding pool comprising a master encoder MVE and at least one slave encoder SVEi, each encoder MVE, SVEi receiving an uncompressed video stream UM, USi and issuing an encoded video stream TM, TSi via a first extremity of an IP link IPLM, IPLi, all second extremities of said IP links IPLM, IPLi being bound to a switch IPS, the at least one slave encoder SVEi sending a piece of information on the complexity Cli of the corresponding received uncompressed video stream USi, the master encoder MVE evaluating an allocation for output bitrate BRi of the at least one slave encoder SVEi from the piece of information on the complexity Cli and sending said allocation BRi to the at least one slave encoder SVEi.

According to the invention, the piece of information on the complexity Cli and the allocation for output bitrate BRi are transmitted via a path $P_i$ comprising the IP link IPLi, the switch IPS and the IP Link IPM.

An advantage of the invention is that it enables to reduce the cost, in both design and manufacturing of encoding pools. The encoding pool according to the invention has to be associated with an IP switch which is an "on the shelf" and then efficient and low price product.

Another advantages carried by the removal of dedicated link between encoders of a same pool are the following:
- better coupling with video stream because of the simultaneous use the same link;
- better reliability of the pool due to the feature "on the shelf" of the IP switch used;
- automatically support redundancy if video is redundant;
- bigger physical distance possible between encoders;
- increase of the number of encoders in the same pool.

Thus, the present invention concerns according to a second aspect a method for driving individual output bitrates for encoders gathered in an encoding pool, said encoding pool comprising a master encoder MVE and at least one slave encoder SVEi, each encoder MVE, SVEi receiving an uncompressed video stream UM, USi and issuing an encoded video stream TM, TSi with said output bitrate via a first extremity of an IP link IPLM, IPLi, a second extremity of said IP links IPLM, IPLi being bound to a switch IPS.

According to the invention, it comprises:
- A step S1 for sending, by the at least one slave encoder SVEi to the master encoder MVE, a piece of information on the complexity Cli of the uncompressed video stream USi it receives, via a path $P_i$ comprising the IP link IPLi, the switch IPS and the IP Link IPM;
- A step S2 for evaluating by the master encoder MVE an allocation for output bitrate BRi for the at least one slave encoder SVEi from the piece of information on the complexity Cli;

A step S3 for sending the allocation for output bitrate BRi by the master encoder MVE to the at least one slave encoder SVEi via the path $P_i$;

A step S4 for issuing encoded stream CSi by the at least one slave encoder SVEi at the allocated output bitrate BRi.

BRIEF DESCRIPTION OF THE DRAWINGS

The invention will be better understood and illustrated by means of the following embodiments and execution examples, in no way limitative, with reference to the appended figures on which.

DESCRIPTION OF PREFERRED EMBODIMENTS

The appended drawings may serve not only to complete the invention, but also to contribute to its definition, if need be.

Figure 2:
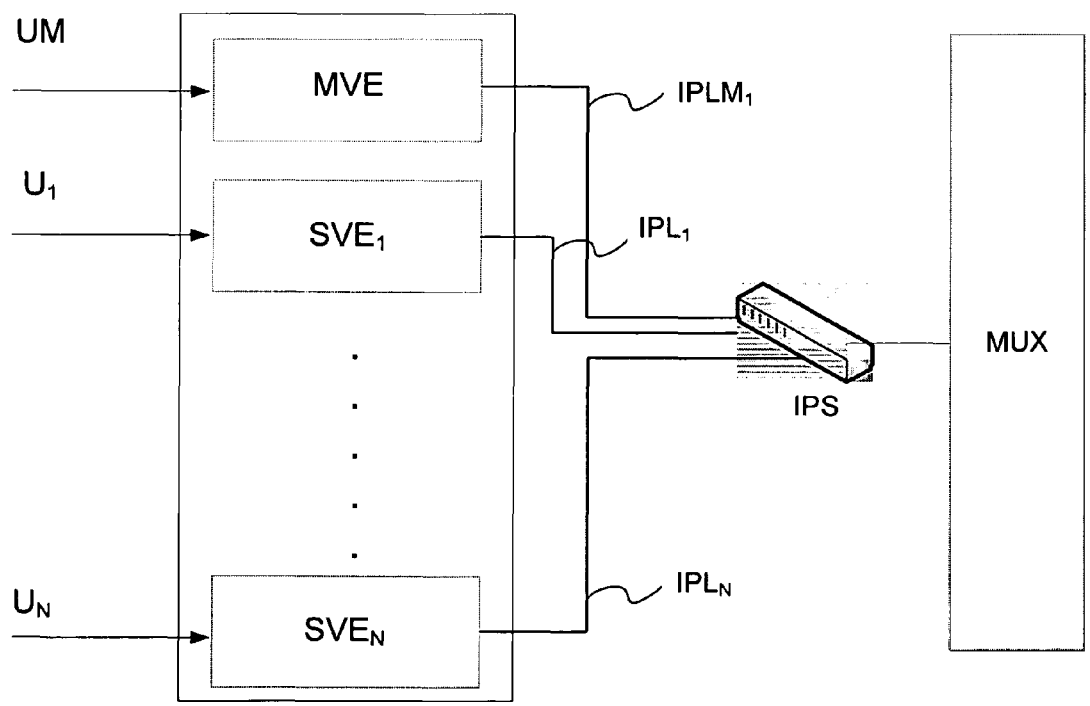
FIG. 2 represents architecture of an encoding pool according to the invention.

The FIG. 2 represents an encoding pool according to the invention. The encoding pool comprises a master encoder MVE and a number N of slave encoders $SVE_i$ where the index i is an integer comprised between 1 and N. Each encoder MVE, $SVE_i$ receives an uncompressed video stream UM, $US_i$ and delivers a coded video stream CM, $CS_i$ on an IP link.

Figure 1:
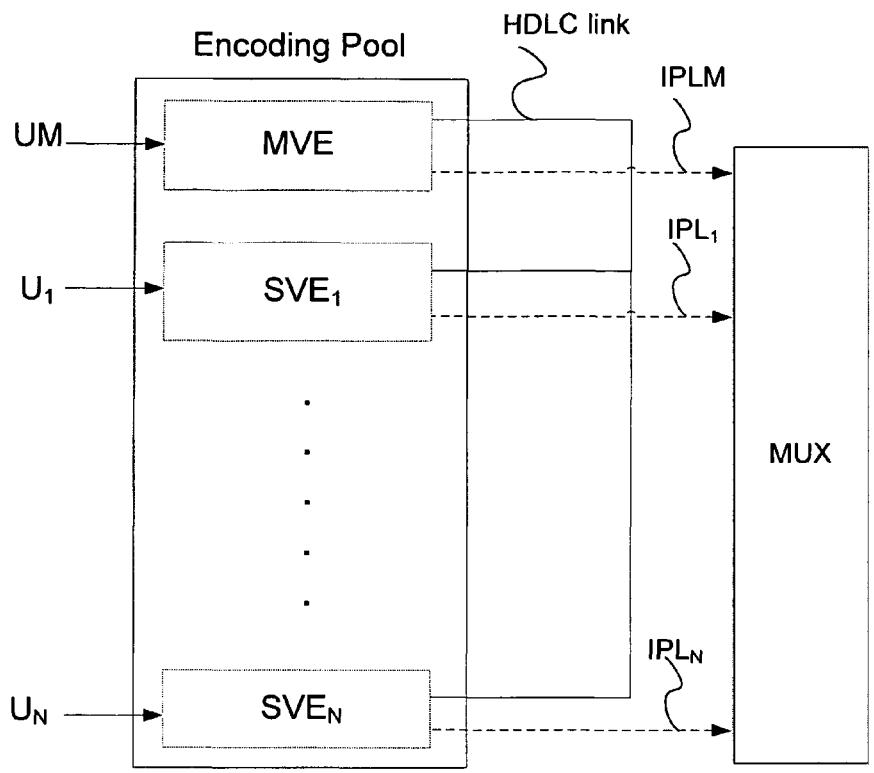
FIG. 1, already briefly described, represents architecture of a encoding pool according to the prior art.

One denotes a slight difference between the streams shown in FIG. 1.

One still can not make any difference between the streams received by master encoder and the slave encoders, and the encoded streams circulating on links $IPL_i$ issued by master encoder and the slave encoders.

But, on the links $IPL_i$ one also finds first complementary signaling streams delivered in a multicast way from the master encoder MVE to the slaves encoders $SVE_i$ for requesting information related to the complexity of uncompressed streams and second complementary unicast signaling streams delivered in a unicast way from slave encoders $SVE_i$ to the master encoder MVE for supplying the requested complexity.

Each slave encoder $SVE_i$ is adapted for evaluating the complexity Cli of the corresponding received uncompressed video stream USi, and for sending a piece of information on this complexity Cli over the IP link. The pieces of information reach the master encoder MVE via the IP switch IPS which is a switch adapted for minimizing network traffic perturbation between encoders of the same pool.

Advantageously, the encoders MVE, SVEi of the pool are designed for supporting IEEE1588 protocol.

Advantageously, each video slave encoder SVEi sends, simultaneously to the piece of information on the complexity Cli, a timestamp representative of the date of sending of said piece of information.

Advantageously, the master encoder MVE evaluates the timestamp for qualifying the pertinence of the piece of information on the complexity Cli.

Advantageously, the switch IPS is designed for supporting IEEE1588 protocol.

Advantageously, the links $IPL_i$ are Ethernet links.

Nowadays, most of the encoders stream audiovisual program over Internet protocol. In this case, dedicated Ethernet links used for streaming audiovisual program are already available in the encoders.

Advantageously, the IP links $IPL_i$ are Ethernet links.

From the hardware arrangement shown on FIG. 2, one can carry out a method for driving individual output bitrates for encoders gathered in an encoding pool. Each encoder MVE, $SVE_i$ receives an uncompressed video stream UM, $US_i$ and issues an encoded video stream TM, $TS_i$ at said output bitrate via a first extremity of an IP link IPLM, $IPL_i$ a second extremity of said IP links IPLM, $IPL_i$ being bound to a switch IPS. N paths $P_i$ exist which comprise the IP link $IPL_i$, the switch IPS and the IP link IPM. These N paths $P_i$ are used for exchanging information between slave encoder SVEi and master encoder SVE.

The first step S1 of said method consists in sending by each slave encoder $SVE_i$ to the master encoder MVE information on the complexity $CI_i$ of the uncompressed video stream $US_i$ it receives, this information is sent via the path $P_i$ comprising the IP link $IPL_i$ the switch IPS and the IP Link IPM;

The second step S2 of said method consists in evaluating by the master encoder MVE an allocation for output bitrate $BR_i$ for the slave encoders $SVE_i$ from received information $CI_i$ on the complexity, the means for evaluating output bitrate BRi are well known and are for example equivalent to the one carried out in the encoder pool according to the prior art;

The third step S3 of said method consists in sending the evaluated allocation for output bitrate $BR_i$, by the master encoder MVE to the slave encoders $SVE_i$ via the path $P_i$;

The fourth step S4 for issuing encoded stream $CS_i$ by the at least one slave encoder $SVE_i$ at the allocated output bitrate $BR_i$ over the IP link $IPL_i$.

Advantageously, the step S1 further comprises an emission of a timestamp representative of the date at which the sending of the piece of information on the complexity $CI_i$ is performed.

Advantageously, the step S2 starts with an evaluation of the timestamp for qualifying pertinence of the piece of information on the complexity Cli.

Algorithms run over the encoders for measuring and compensating the latency for exchanged information as far there is more jitter on LAN network than on dedicated link One of the major challenges of the invention is to reach at least the same performances than these provided by local Flextream carried out on encoder pool according to prior art, in particular:

High differential time accuracy for bitrate changing between encoders; and

Autonomy, no intervention of any external master equipment is required.

For complying with the time accuracy requirements, one implements a synchronization mechanism having three levels:

real-time IP stack for minimizing message jitter in the internal paths of each encoder MVE, SVEi; in this case, simultaneity is performed by a common multicast message sent to all the slave encoders $SVE_i$ by master encoder MVE;

algorithm for measuring and compensating messages latency through the network between master encoder MVE and slave encoders SVEi. This is for guaranteeing simultaneity of bitrate changes among encoders by applying delay compensation; in this case, simultaneity is done by the common multicast message sent to all the slaves after applying network latency compensation measured by a side mechanism;

implementing a dedicated RX/TX hardware channel similar to these used for TS over IP streams for increasing latency performances; in this case, simultaneity is done by the common multicast message sent to all the slave encoders $SVE_i$ after applying network latency compensation measured by a side mechanism and without jitter issued from latency message in internal path between hardware part and software part Depending on the network perturbation, the three mechanisms above can be activated in a scalable way.

The invention is not limited to the embodiments of encoding pool, and method described above, only as examples, but it encompasses all alternative embodiments which may be considered by one skilled in the art within the scope of the claims hereafter.

The invention claimed is:

1. Encoding pool comprising a master encoder and at least one slave encoder, each encoder receiving an uncompressed video stream and issuing an encoded video stream via a first extremity of an IP link, all second extremities of said IP links being bound to a switch, the at least one slave encoder sending a piece of information on the complexity of the corresponding received uncompressed video stream, the master encoder evaluating an allocation for output bitrate of the at least one slave encoder from the piece of information on the complexity and sending said allocation to the at least one slave encoder, wherein the piece of information on the complexity and the allocation for output bitrate are transmitted via a path comprising the IP link connecting the slave encoder and the switch, the switch and the IP Link connecting the master encoder and the switch.

2. Encoding pool according to claim 1, wherein the encoders of the pool are designed for supporting IEEE1588 protocol.

3. Encoding pool according to claim 2, wherein each slave encoder sends, simultaneously to the piece of information on the complexity, a timestamp representative of the date of sending of said piece of information.

4. Encoding pool according to claim 3, wherein the master encoder evaluates the timestamp for qualifying the pertinence of the piece of information on the complexity.

5. Encoding pool according to claim 3, wherein the switch is designed for supporting IEEE1588 protocol.

6. Encoding pool according to claim 1, wherein the IP links are Ethernet links.

7. Method for driving individual output bitrates for encoders gathered in an encoding pool, said encoding pool comprising a master encoder and at least one slave encoder, each encoder receiving an uncompressed video stream (UM, USi) and issuing an encoded video stream with said output bitrate via a first extremity of an IP link, a second extremity of said IP links being bound to a switch, wherein it comprises:

A step for sending, by the at least one slave encoder to the master encoder, a piece of information on the complexity of the uncompressed video stream it receives, via a path comprising the IP link, the switch and the IP Link;

A step for evaluating by the master encoder an allocation for output bitrate for the at least one slave encoder from the piece of information on the complexity;

A step for sending the allocation for output bitrate by the master encoder to the at least one slave encoder via the path; and A step for issuing encoded stream by the at least one slave encoder at the allocated output bitrate.

8. Method according to claim 7 wherein the sending step further comprises an emission of a timestamp representative of the date at which the sending of the piece of information on the complexity is performed.

9. Method according to claim 8, wherein the evaluating step starts with an evaluation of the timestamp for qualifying pertinence of the piece of information on the complexity.

10. Method according to claim 8, wherein it involves a synchronization mechanism for insuring the bitrates changes for are synchronous on all slave encoders.

* * * * *